(12) United States Patent
Gallagher

(10) Patent No.: US 9,981,448 B2
(45) Date of Patent: May 29, 2018

(54) WATERPROOF GARMENT WITH INVISIBLE BARRIER SEAM

(71) Applicant: Cohesive Systems LLC, Mechanicsville, PA (US)

(72) Inventor: Joseph E. Gallagher, Mechanicsville, PA (US)

(73) Assignee: Cohesive Systems LLC, Mechanicsville, PA (US)

( * ) Notice: Subject to any disclaimer, the term of this patent is extended or adjusted under 35 U.S.C. 154(b) by 135 days.

(21) Appl. No.: 14/696,949

(22) Filed: Apr. 27, 2015

(65) Prior Publication Data

US 2015/0224738 A1 Aug. 13, 2015

Related U.S. Application Data

(63) Continuation of application No. 13/574,714, filed as application No. PCT/US2011/022230 on Jan. 24, 2011, now Pat. No. 9,017,505.

(Continued)

(51) Int. Cl.
*A41D 27/24* (2006.01)
*B32B 5/06* (2006.01)
(Continued)

(52) U.S. Cl.
CPC .............. *B32B 5/06* (2013.01); *A41D 27/24* (2013.01); *A41D 27/245* (2013.01); *B29C 65/5042* (2013.01); *B29C 65/5057* (2013.01); *B29C 66/1122* (2013.01); *B29C 66/1352* (2013.01); *B29C 66/43* (2013.01); *B29C 66/72343* (2013.01); *B29C 66/72941* (2013.01); *B29C 66/73175* (2013.01); *B32B 5/026* (2013.01); *B32B 5/30* (2013.01); *B32B 7/12* (2013.01); *B32B 27/12* (2013.01); *B32B 27/32* (2013.01); *B32B 27/322* (2013.01); *B32B 27/36* (2013.01); *B32B 27/40* (2013.01); *B29C 65/08* (2013.01); *B29C 65/4815* (2013.01); *B29C 65/4825* (2013.01); *B29C 65/62* (2013.01); *B29C 66/1142* (2013.01); *B29C 66/71* (2013.01); *B29C 66/72323* (2013.01);
(Continued)

(58) Field of Classification Search
CPC ...................................................... A41D 27/24
USPC .......................................................... 428/61
See application file for complete search history.

(56) References Cited

U.S. PATENT DOCUMENTS 3,953,566 A 4/1976 Gore
5,698,056 A 12/1997 Kamiyama et al.
(Continued)

FOREIGN PATENT DOCUMENTS

DE 19917369 A1 10/2000
DE 102007061936 A1 7/2008
(Continued)

*Primary Examiner* — Brent T O'Hern
(74) *Attorney, Agent, or Firm* — Posternak Blankstein & Lund LLP

(57) ABSTRACT

A waterproof invisible barrier seam is formed between two fabric laminates, an outer shell fabric laminate and an inner lining fabric laminate. The seam includes an invisible seam tape that forms a hydrostatic barrier within the seam. The design of the seam allows the formation of an effective hydrostatic barrier along the seams of a soft shell garment, while retaining flexibility, stretch, aesthetic appearance, and reversibility.

16 Claims, 3 Drawing Sheets

Related U.S. Application Data

(60) Provisional application No. 61/301,366, filed on Feb. 4, 2010, provisional application No. 61/297,477, filed on Jan. 22, 2010.

(51) Int. Cl.
  *B32B 7/12* (2006.01)
  *B29C 65/50* (2006.01)
  *B29C 65/00* (2006.01)
  *B32B 5/02* (2006.01)
  *B32B 5/30* (2006.01)
  *B32B 27/12* (2006.01)
  *B32B 27/32* (2006.01)
  *B32B 27/36* (2006.01)
  *B32B 27/40* (2006.01)
  *B29L 31/48* (2006.01)
  *B29C 65/08* (2006.01)
  *B29C 65/48* (2006.01)
  *B29C 65/62* (2006.01)

(52) U.S. Cl.
  CPC .. *B29C 66/72325* (2013.01); *B29L 2031/4842* (2013.01); *B32B 2250/03* (2013.01); *B32B 2262/0284* (2013.01); *B32B 2262/08* (2013.01); *B32B 2264/0257* (2013.01); *B32B 2305/026* (2013.01); *B32B 2307/304* (2013.01); *B32B 2307/724* (2013.01); *B32B 2307/7265* (2013.01); *B32B 2307/73* (2013.01); *B32B 2437/00* (2013.01); *B32B 2471/02* (2013.01); *B32B 2601/00* (2013.01); *Y10T 428/249921* (2015.04); *Y10T 428/249953* (2015.04); *Y10T 442/10* (2015.04)

(56) References Cited

U.S. PATENT DOCUMENTS

| | | |
|---|---|---|
| 6,018,819 A | 2/2000 | King et al. |
| 6,497,934 B1 | 12/2002 | Mahn, Jr. et al. |
| 7,191,497 B2 | 3/2007 | Butz |
| 7,666,802 B2 | 2/2010 | Capweli |
| 7,790,261 B2 | 9/2010 | Liggett |
| 8,945,287 B2 | 2/2015 | Haggquist |
| 9,017,505 B2 | 4/2015 | Gallagher |
| 2002/0100540 A1 | 8/2002 | Savitski et al. |
| 2002/0157785 A1 | 10/2002 | Anderson et al. |
| 2004/0266297 A1 | 12/2004 | Schierenbeck et al. |
| 2005/0086726 A1* | 4/2005 | Poole ............... A41B 11/002 2/239 |
| 2006/0217020 A1* | 9/2006 | McGinley ......... A41D 31/0038 442/221 |
| 2009/0222980 A1 | 9/2009 | Klug et al. |

FOREIGN PATENT DOCUMENTS

| | | |
|---|---|---|
| WO | WO 98/29000 | 7/1998 |
| WO | WO 2005/037543 | 4/2005 |
| WO | WO 2015/108564 | 7/2015 |

* cited by examiner

WATERPROOF GARMENT WITH INVISIBLE BARRIER SEAM

BACKGROUND

The availability of waterproof or water resistant fabrics for outerwear presents challenges to create seams that share the water shedding characteristics of the fabrics. Laminated waterproof fabrics typically contain an outer face fabric of water repellant material, an inner insulating fabric such as polar fleece, with a hydrostatic barrier material between the inner and outer fabrics. The use of laminated fabrics containing a hydrostatic barrier material poses the problem of how to join the barrier material across a seam without introducing leak pathways. Existing methods of joining such fabrics to form a waterproof seam are unsatisfactory and commercially non-viable because they result in a bulky, stiff, and unattractive seam; because they do not succeed in fully merging the hydrostatic barrier across the seam; or because they are difficult and time consuming to manufacture. Thus, there remains a need for improved methods and seam designs for creating waterproof seams for outer garments and other textile products.

SUMMARY OF THE INVENTION

The invention provides a hydrostatic or waterproof "invisible barrier" fabric seam, methods for making the seam, and garments or other products containing the seam.

One aspect of the invention is an invisible barrier fabric seam. The seam is resistant to penetration by water or any of a variety of chemical and/or biological agents. The properties of the seam rely on the application of a seam tape that provides a hydrophobic polymer membrane within the seam and along the length of the seam. The seam tape is invisible from both outer surfaces of the finished seam. Compared to prior water resistant or waterproof seams, the invisible barrier seam is more flexible, more aesthetic in appearance, and results in a completely reversible garment. Because the seam tape is protected within the seam, the invisible barrier seam is also more durable.

In still another aspect of the invention, an invisible barrier seam is formed by first making an outer garment and an inner garment and then bonding the two garments together at the seams to form a single garment. The method includes the following steps: (1) The starting components for making the seam are made or provided from a commercial source. These include an outer shell fabric laminate, an inner liner fabric, and a barrier seam tape. The outer shell fabric laminate contains a shell fabric laminated to a hydrophobic polymer membrane. In an alternative embodiment the outer shell fabric laminate contains a polymer encapsulation layer. The seam tape contains a low melt adhesive film layer and a high melt barrier film layer such as a hydrophobic polymer membrane; optionally the seam tape also contains a release paper covering the adhesive layer and/or the barrier film. (2) Outer garment pieces are cut out of the shell laminate according to an outer garment pattern. (3) Inner garment pieces are cut out of the liner fabric according to an inner garment pattern, which has overlapping seam locations compared to the outer garment pattern. (4) Each of the outer and inner garments is separately assembled. The seams of the outer and/or inner garments are initially formed using an ultrasonic weld operation, by sewing, or by using a centerline adhesive film that provides a tack to hold the pieces together. (5) The adhesive layer of the seam tape is welded by heat or ultrasound onto the hydrophobic polymer membrane surface of the shell fabric of the assembled outer garment. (6) The inner garment is then positioned inside of the outer garment and aligned. (7) The complete composite garment is assembled by welding the seams of the inner garment to the seams of the outer garment; this is accomplished by applying heat or ultrasound energy to the seams so that the low melt adhesive layer of the seam tape adheres to and seals the seam in the liner fabric along the length of the seam. In some embodiments an adhesive layer is present, either on the inner face of the liner fabric or on the inner face of the hydrophobic polymer membrane. The adhesive layer can then be heat- and/or pressure-activated following assembly of the composite garment in order to fix the inner and outer garments together over their full surfaces.

Another aspect of the invention is a method of forming an invisible barrier fabric seam. The method includes the following steps. (1) Three components for making the seam are made, or provided from a commercial source: an outer shell fabric laminate, an inner lining fabric laminate, and a seam tape. The shell fabric laminate includes an outer shell fabric which faces the outside of the final garment (ordinarily, the side facing away from the body of the wearer), a hydrophobic polymer membrane attached to the shell fabric, and optionally a lightweight tricot or scrim attached to the membrane. The liner fabric laminate includes a liner fabric. n An adhesive component or adhesive layer is optionally attached to the liner fabric on the opposite side from the side facing the inside of the final garment or to the hydrophobic polymer membrane of the shell laminate. The liner fabric is a fleece or other non-containable, preferably insulating fabric, and ordinarily is exposed at the inner surface of the garment facing towards the body of the wearer. If present in the liner laminate, the adhesive component is capable of adhering to the shell fabric laminate, by adhering to the barrier membrane or optional tricot/scrim. The seam tape contains an optional inner low melt adhesive film layer which faces the lining laminate in the finished seam, a high melt barrier film layer such as a hydrophobic polymer membrane, an exterior low melt adhesive layer which faces the shell laminate, and an optional release paper covering one or both adhesive layers. The barrier film layer is disposed between the inner and outer adhesive layers. (2) The liner laminate is laminated to the shell laminate to form a single, shell-liner composite laminate. (3) A pattern for two or more garment fabric pieces is then applied to the shell-liner laminate, and the pieces are cut out. (4) The pieces are then placed together and aligned with the shell fabric sides facing together, so as to form a seam track along one edge of the aligned pieces. (5) The seam is initially formed using an ultrasonic weld operation to connect the outer laminates, by sewing only the outer shell laminates together, or by using a centerline adhesive film that provides a tack to hold the outer shell laminates together. (6) The edges of the adjacent liner fabrics, and of the optional tricot or scrim of the outer laminate if present, and the seam tape is inserted into the seam between the adhesive component of the liner laminate and the hydrophobic barrier membrane or tricot/scrim of the face laminate. (7) Heat or ultrasound is used to weld the barrier seam tape into position and to create a hydrostatic seal along the seam. (8) The liner fabric is then secured to complete the seam by heat welding using an adhesive film that holds the liner fabric in place.

Yet another aspect of the invention is a method of forming an invisible barrier fabric seam. The method includes the following steps. (1) Three components for making the seam are made, or provided from a commercial source: an outer shell fabric laminate, an inner lining fabric, and a seam tape.

The shell fabric laminate includes an outer shell fabric which faces the outside of the final garment, a hydrophobic polymer membrane attached to the shell fabric, and a membrane-protective fabric such as a lightweight tricot or scrim attached to the membrane. The liner fabric is a fleece or other non-containable, preferably insulating fabric. The seam tape contains an inner low melt adhesive film layer which faces the lining fabric in the finished seam, a high melt barrier film layer such as a hydrophobic polymer membrane, an exterior low melt adhesive layer which faces the shell laminate, and optionally a release paper covering one or both adhesive layers. (2) A pattern for two or more garment fabric pieces is then applied to the shell laminate and liner fabric, and the pieces are cut out. (3) The pieces are then placed together and aligned with the shell fabric sides facing together, so as to form a seam track along one edge of the aligned pieces. (4) The seam is initially formed using an ultrasonic weld operation to connect the shell laminates, by sewing only the shell laminates together, or by using a centerline adhesive film that provides a tack to hold the outer shell laminates together, while not restricting the inner lining from being folded back (5) The edges of the adjacent liner fabrics are withdrawn back from each side of the centerline of the seam, and the seam tape is inserted into the seam between the inner face of the liner fabric and the hydrophobic barrier membrane or tricot/scrim of the shell laminate. (6) Heat or ultrasound is used to weld the barrier seam tape into position and to create a hydrostatic seal along the seam. (8) The liner fabric is then folded back towards the centerline of the seam and heat welded to the remaining adhesive layer of the seam tape to complete the seam.

In another aspect of the invention, an invisible barrier seam is formed by first making an outer garment and an inner garment and then bonding the two garments together to form a single laminated garment. The method includes the following steps: (1) The starting components for making the seam are made or provided from a commercial source. These include an outer shell fabric laminate, an inner liner fabric laminate, a barrier seam tape, and an adhesion layer attached to either the outer shell laminate or the liner laminate. The outer shell fabric laminate contains a shell fabric laminated to a hydrophobic polymer membrane, or the outer shell fabric laminate contains a polymer encapsulation layer. The liner fabric laminate includes a liner fabric. The seam tape contains an inner low melt adhesive film layer and a high melt barrier film layer such as a hydrophobic polymer membrane, an optional exterior low melt adhesive layer, and an optional release paper covering one or both adhesive layers. (2) Outer garment pieces are cut out of the shell laminate according to an outer garment pattern. (3) Inner garment pieces are cut out of the liner laminate according to an inner garment pattern, which has one or more non-overlapping seam locations compared to the corresponding seams in the outer garment pattern, though some of the seams can be overlapping. (4) Each of the outer and inner garments is separately assembled. The seams of the outer and/or inner garments are initially formed using an ultrasonic weld operation, by sewing, or by using a centerline adhesive film that provides a tack to hold the pieces together. (5) The seam tape is welded by heat, hot air, or ultrasound onto the hydrophobic polymer membrane surface of the shell fabric of the assembled outer garment. (6) The inner garment is then positioned inside of the outer garment and aligned. (7) The complete garment assembly is then subjected to an alignment lamination step by applying a heat and/or pressure source to the entire garment.

Yet another aspect of the invention is a method of assembling a garment having multi-ply seams. The method includes the steps of: (1) preparing an outer garment having seams and an inner garment having seams that match the position of the outer garment seams; (2) aligning one or more seams in the outer garment with corresponding seams in the inner garment; (3) performing a soft-set adhesion of the outer and inner garments along the aligned seams, whereby the seams adhere together but remain adjustable; (4) adjusting the alignment of the outer and inner garments with respect to each other by loosening, moving, and reattaching the soft-set seams; and (5) performing a hard-set adhesion of the outer and inner garments along the aligned and adjusted seams to form a garment having one or more multi-ply seams. In some embodiments the outer garment contains an outer shell laminate having a shell fabric and a hydrophobic polymer membrane and the inner garment contains a fleece or other non-containable, insulating fabric. In some embodiments a seam tape is applied along the seam tracks between the outer and inner garments. In some embodiments the inner garment and/or the outer garment includes a layer of a heat-activated adhesive material that is used for the soft-set and/or hard-set assembly steps.

Still another aspect of the invention is a method of forming an invisible barrier seam using a single-ply seam tape. Pieces of an outer shell laminate are joined along a seam track using ultrasonic welding to form a centerline bead a short distance from the edge of the fabrics. The shell laminate includes an outer shell fabric layer and a hydrophobic barrier membrane layer. The pieces are joined with the outer shell fabrics facing each other. The centerline bead holds the fabrics together. Flaps of the fabric from each piece protruding from the centerline bead are folded back on the inside of the seam along the seam track, and a single-ply seam tape comprising an adhesive polymer is adhered across the inside of the seam, at least partially covering the flaps; the width of the seam tape can be less than the combined width of the flaps. Corresponding pieces of liner fabric are joined along a seam track using an ultrasonic cut-and-weld process that forms a centerline bead and removes remaining loose fabric material, exposing the centerline bead. The welded liner pieces are then positioned such that the centerline bead of the joined liner pieces is aligned along the centerline bead of the joined shell laminate pieces. The seam is then fused together by applying heat and/or pressure so as to set the adhesive polymer in the seam tape.

Another aspect of the invention is a method of forming an invisible barrier seam. In any of the foregoing methods, except embodiments that involve sewing to form a seam, a string adhesive is included at the butt joint between the two outer shell fabric pieces at the seam. When the seam is welded by heat or ultrasound energy, the adhesive material of the string adhesive melts and coats the cut edges of the shell fabrics, effectively sealing the edges and bonding the edges of the adjacent shell fabric pieces together. The result is a more robust and durable seam.

Still another aspect of the invention is a method of forming an outer shell intermediate structure for an invisible barrier seam. Two-ply outer shell fabric pieces (each having a shell fabric layer and a barrier membrane layer) are aligned with the outer shell fabrics facing each other, and ultrasonically welded together along the length of the seam at a short distance from the edge of the pieces. The free edges are then folded over to lie flat against the barrier membrane. A barrier seam tape is adhered over the folded edges such that the barrier layer of the seam tape contacts the barrier membranes of both fabric pieces and forms a continuous barrier membrane layer across the seam.

Another aspect of the invention is a method of forming an inner liner intermediate structure for an invisible barrier seam. Two-ply inner liner fabric pieces (each having a liner fabric layer and an adhesive layer) are aligned with the liner fabrics facing each other, and ultrasonically welded together along the length of the seam at a short distance from the edge of the pieces. The free edges are then folded over to lie flat against the adhesive layer. Optionally, a liner seam tape is then applied over the exposed edges and bonded to the adhesive layer of the liner fabric pieces to strengthen the seam and/or to add an additional permeability barrier along the seam.

Yet another aspect of the invention is a textile product, such as a garment, containing an invisible barrier fabric seam. In some embodiments, the garment as a whole is resistant or essentially impervious to penetration by water. Some embodiments are also essentially impervious to penetration by any of a variety of chemical and/or biological agents. Some such embodiments include an adsorbent for chemical and/or biological agents; the adsorbent is embedded within the liner fabric or added as an additional layer to the liner fabric laminate or between the outer shell layer and the inner liner layer. Optionally, the assembled inner liner layer includes a chemical/biological agent resistant seam tape having an adhesive layer and a fabric layer possessing and adsorbent for chemical and/or biological agents. In certain embodiments, the textile product includes one or more insulation zones, each zone having a desired amount of insulating material, such as a fleece or other non-containable fabric, or an air bladder added between the outer shell layer and the inner liner layer. The insulation zones are selected to provide added warmth and comfort to selected areas of the body without restricting movement or adding weight.

Still another aspect of the invention is a seam tape for preparing an invisible barrier seam. The seam tape includes an inner low melt adhesive film layer, a high melt barrier film layer, an optional exterior low melt adhesive layer, and an optional release paper covering one or both adhesive layers. The barrier film layer is disposed between the inner and outer adhesive layers. In some embodiments, the seam tape also contains a reinforcing fabric layer; the fabric layer is also disposed between the inner and outer adhesive layers, adjacent to either side of the barrier film layer.

Other features and advantages of the invention will be apparent from the following description of the preferred embodiments thereof and from the claims, taken in conjunction with the accompanying drawings.

BRIEF DESCRIPTION OF THE DRAWINGS

Other features and advantages of the invention will be apparent from the following description of the preferred embodiments thereof and from the claims, taken in conjunction with the accompanying drawings.

DETAILED DESCRIPTION OF THE INVENTION

Figure 1A:
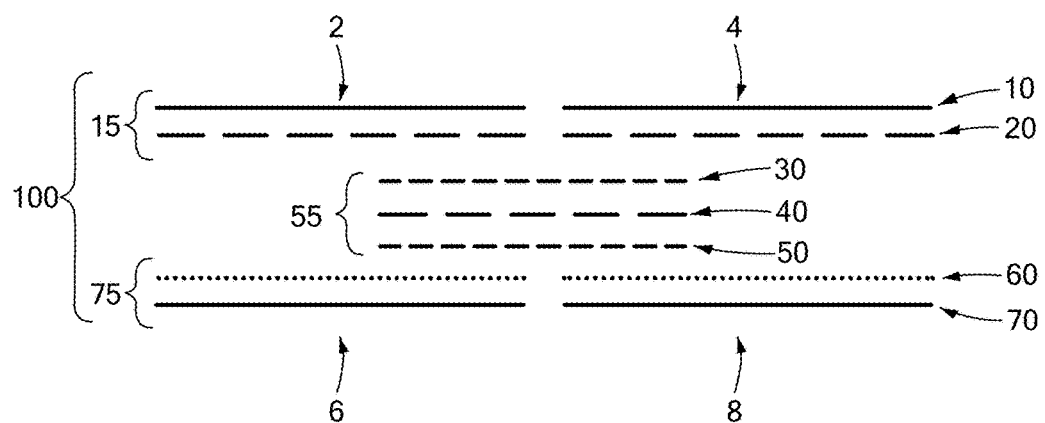
FIGS. 1A and 1B show schematic views of invisible barrier seams according to the invention.

The invention provides an "invisible barrier seam" and methods for making the seam, seam tapes, and garments or other textile products containing the seam. An invisible barrier seam according to the invention creates a hydrostatic barrier between two pieces of waterproof or water resistant fabric. This is accomplished using a seam design that allows a seam tape containing a hydrophobic polymer membrane to be adhered to the inner surfaces of an outer fabric and an inner fabric that are joined at the seam. The result is a hydrostatically sealed seam structure possessing a seam tape that cannot be seen from either the outer face or the inner face of the seam. The invisible barrier seam is especially suited for joining laminated fabrics needed to make "shell" jackets and other outerwear, having a water resistant outer shell, a non-containable insulating inner lining fabric such as a fleece, and a hydrophobic polymer membrane between the shell and lining.

The term "non-containable fabric" as used herein refers to a fabric that does not allow saturation of the spaces between fibers of the fabric by an adhesive to create a hydrostatic seal. A non-containable fabric generally has a large volume of open space between microfibers of the fabric. Examples of a non-containable fabric include fleece and other insulating materials.

A "fleece" as used herein refers to a pile fabric, including woolen fabrics as well as synthetic fabrics. Fleece for use in the invention can be made of or derived from natural fiber such as wool or a synthetic polymer, such as polyethylene terephthalate (PET) (e.g., Polarfleece® by Polartec, LLC). Fleece is typically lightweight, insulating, hydrophobic, and breathable, i.e., allowing water vapor to pass through. Pile fabrics are made by dying loose fibers, which are then mixed and combed into a long rope that is guided into a knitting machine, which permanently locks the fibers into a backing. The fabric is then sheared and finished. A pile results from the individual fibers standing on end. Fleece is made by first twisting fibers into a yarn, which is then knitted into a fabric. The fabric is then brushed, sheared, and finished.

An "insulating material" as used herein refers to a natural or synthetic material that provides thermal insulation. Insulation for use in the invention can be made of synthetic lofted continuous filament insulation such as Climashield® Apex by HarVest Consumer Insulation, or Thinsulate™ microfibers by 3M. Insulating material is preferably lightweight and breathable, and made from fibers that can be hydrophobic or hydrophilic, fire retardant, flexible, and obtained from recycling or from a renewable fiber. One or more layers of fabric, such as a fleece or other non-containable fabric, or a tricot, can also be used as an insulating material.

Fabrics joined by a seam according to the invention, or created in the process of forming a seam according to the invention, can be laminated fabrics or coated fabrics, and preferably are waterproof laminated fabrics. A "laminated fabric" for use in the present invention or formed by a method of the present invention is a fabric that includes at least three layers: an outer layer containing a face fabric, an inner layer containing a non-containable fabric such as fleece or another insulating material, and a middle layer disposed between the outer and inner layers and containing a hydrophobic polymer membrane. Additional layers may also be present, such as one or more support layers for the hydrophobic barrier membrane and layers of adhesive between structural layers. A "coated fabric" or "encapsulated fabric" for use in the invention is a fabric that has been coated with a chemical agent such as silicone, polyurethane, polyester, or polypropylene that coats the fabric and forms a liquid layer or a coating within the fabric, or on the surface of the fabric (such as the back surface of an outer shell fabric) that serves the same function as a hydrophobic polymer membrane in a laminated fabric. Therefore, if a suitable encapsulated is used, for example, as the outer shell fabric, then a hydrophobic polymer membrane of a fabric laminate can be optionally omitted. The fabric pieces joined by a seam of the invention can be of identical or different materials, color, or texture, according to the design or other requirements of the garment or textile product in which the seam is located.

A "hydrophobic polymer membrane" or "hydrostatic barrier membrane" as used herein refers to a layer of synthetic or natural polymers that resists the passage of liquid water, in the form of droplets or microdroplets, across the membrane. Preferably, the hydrophobic polymer membrane allows the passage of water vapor, in the form of individual water molecules, so as to promote breathability of the laminated fabric. A hydrophobic polymer membrane can be prepared from a material such as microporous or nanoporous polytetrafluoroethylene (PTFE), expanded PTFE (ePTFE), polyurethane, cross-linked polyurethane, polypropylene, or polyester.

The outer shell or face fabric can be any fabric, but preferably is mechanically strong, abrasion resistant, and may also be water repellent. The face fabric can be, for example, a soft woven fabric, or any fabric woven or knit from one or more yarns of synthetic or natural material. Materials for the face fabric can include, for example, polyesters, polyamides, polyvinylchlorides, polyketones, polysulfones, polycarbonates, fluoropolymers, polyacrylates, polyurethanes, co-polyetheresters, polypropylenes, and co-polyetheramides. The face fabric can have any desired color and texture (e.g., it can have a camouflage pattern or it can be infrared or near-infrared absorptive or reflective), and can be dyed or impregnated as needed to achieve a desired appearance or functionality, such as water repellency (DWR). The face fabric may contain Lycra® or another elastic fiber to create stretch characteristics. Lycra®, also known as spandex or elastane, is a polyurethane polyurea copolymer that can be woven into a fabric, such as a face our outer shell fabric, a liner fabric, or a seam tape fabric to provide elasticity. Alternatively, elasticity or stretch can be provided by using a woven or non-woven fabric having stretch in at least one direction. It is preferred that the face fabric, liner fabric, and any seam tape fabric provide a similar or essentially identical degree of stretch, for optimum comfort and non-restrictive feel of the garment. The fleece fabric can be any fleece, such as a fleece made of PET, and can have any texture, color, or thickness as desired or as appropriate for a particular garment. The fleece is preferably insulating, breathable, and soft to the touch. In addition to the outer, middle, and inner layers, other layers also can be included in a laminated fabric for use in the invention. For example, one or more reinforcing layers can be added to mechanically support the hydrophobic polymer membrane. Adhesives also can be added to join the layers of the fabric, and chemical substances such as flammability retarding agents can be added.

An example of a waterproof laminated fabric is Gore-Tex (see, e.g., U.S. Pat. No. 3,953,566), which utilizes a porous PTFE membrane as the hydrophobic polymer membrane. The PTFE membrane of a Gore-Tex fabric has a microstructure characterized by nodes interconnected by fibrils. The microporous or nanoporous nature of the PTFE membrane is such that water droplets are excluded from the pores, whereas water molecules can pass through the pores.

In some embodiments of the present invention a fabric, fabric laminate, or an entire garment or textile product is impermeable to chemical agents and/or biological agents. Any known method for rendering a fabric impermeable to such agents can be used. For example, an "active agent" as described in U.S. Published Patent Application 20070264203 can be embedded within or coated upon a hydrophobic polymer membrane, a liner fabric, a shell fabric, a seam tape, or an insulating material, where it serves to bind, entrap, and/or inactivate harmful chemical and/or biological agents. Such active agents include, for example, activated carbon, activated aluminum oxide, silica gel, soda ash, aluminum trihydrate, baking soda, p-methoxy-2-ethoxyethyl ester cinnamic acid, zinc oxide, zeolite, titanium dioxide, silver and silver compounds, and molecular filter materials, any of which can be microsized or nanosized.

In certain embodiments the fabrics used can be fire resistant or fire retardant. This can be achieved by a variety of known mechanisms, such as coating the fibers of the outer shell fabric, liner fabric, and/or seam tape with a fire resistant polymer, such as polyurethane, and an oil and water repellant composition, such as fluoroalkyl acrylate copolymer and thiourea formaldehyde. See, e.g., U.S. Pat. No. 7,666,802.

A variety of textile products can utilize an invisible barrier seam of the present invention. Preferably, such textile products are garments or articles of clothing, such as jackets, coats, parkas, raincoats, cloaks, ponchos, shirts, blouses, pants, shoes, boots, gloves, hats, hoods, or other headwear, or underwear such as undershirts, briefs, bras, socks, and diapers. Other textile products into which the invisible barrier seam can be incorporated include blankets, towels, sheets, pet bedding, tents, sleeping bags, tarps, boat covers, carpeting, rugs, mats, window coverings, and upholstery. The invisible barrier seam can also be used in protective suits for handling of hazardous materials, including chemicals, biological materials, and radioactive materials, or in protective suits for firefighters, military personnel, and medical personnel. The invisible barrier seam also can be used in any textile-based structure or device that serves to entrap, store, or transport water or an aqueous liquid, such as bags, hoses, or bladders.

A seam according to the invention can be assembled using an adhesive hydrostatic polymer. An "adhesive hydrostatic polymer" or "polymer adhesive" as used herein refers to a polymeric adhesive material or resin that forms a hydrostatic barrier against the membrane surface. Adhesive polymer resins can be selected for their adhesion properties, hydrophobicity or hydrophilicity, melting point, shear resistance, bonding/coating properties, washing and dry cleaning temperature resistance, cleaning solvent resistance, high temperature resistance (e.g., ability to withstand autoclaving) chemical resistance, gas resistance, resistance to pathogens such as viruses and bacteria, as well as ability to commingle with the laminated fabrics or their components so as to create a hydrostatically sealed seam or a seam that is resistant to chemical and/or biological agents. The seam tape would also be designed to be stretchable to match the stretch characteristics of the face fabric and inner liner laminates. Suitable adhesive polymer resins include, but are not limited to, polyurethanes, polypropylenes, polyamides, polyesters, and polyolefins. The adhesive hydrostatic polymer can be cross-linked or non-cross-linked. The adhesive property of the adhesive hydrostatic polymer can be activated by heat, light, pressure, or chemical reaction, for example. Preferably, the adhesive hydrostatic polymer has a melting temperature that allows it to melt during an application of ultrasonic energy, hot air, or another heat source, and a viscosity in the melted state that allows it to flow through the seam structure, including any non-containable fabric, and be extruded out of the cut end of the seam during a cut/weld operation carried out by an ultrasonic welding machine for fabric seam formation. Preferably the adhesive hydrostatic polymer is hydrophobic. In certain embodiments, the adhesive hydrostatic polymer is flexible and elastic enough to withstand active use of a garment containing the invisible barrier seam without breaking or forming leaks in the waterproof nature of the seam. In certain embodiments, the adhesive hydrostatic polymer can be solvent resistant, shear resistant, heat resistant, or resistant to microbial attack. In certain embodiments, two or more adhesive hydrostatic polymers can be used in the same seam structure. For example, an invisible seam tape according to the invention has an inner layer of adhesive polymer and an outer layer of adhesive polymer. If different adhesive layers are combined in a seam structure, then it can be advantageous to select their melting temperatures as either about the same, or different. Selection of different melting points can allow different parts of the seam to be fused at different times and different temperatures. Different adhesive polymer layers used together in the same seam tape or seam structure can differ in their melting points, for example, by 5, 10, 15, 20, or more ° C.

An adhesive hydrostatic polymer can be supplied to construct a seam according to the invention in a variety of different forms. In a preferred embodiment the adhesive hydrostatic polymer is supplied in the form of a strip or tape that allows it to be conveniently applied along the length of the seam. Optionally, an automated adhesive tape feeding device can be used for this purpose. The shape and dimensions of an adhesive polymer strip can vary, but should be consistent with applying the adhesive polymer resin to the seam such that the resin becomes distributed within the seam and fuses with the hydrostatic membrane material of both fabric pieces along the length of the seam. One or more adhesive strips can be used to make the seam, and the strips can be folded and oriented in different ways so that the adhesive resin flows into the seam structure and contacts the hydrostatic membranes of the fabric pieces.

Machines for performing cut/weld seaming operations using ultrasound are known and commercially available. For example, the firm Jentschmann, AG (Huntwangen, Switzerland) provides a variety of suitable machines. The ultrasound energy applied during seaming can be adjusted according to the needs of the particular seam, including the characteristics of the fabrics and the adhesive. Welding conditions depend on conditions of temperature and humidity and the type of fabric, hydrostatic barrier membrane, and fleece. Ultrasonic machines are available which simply weld fabrics together as well as those which cut fabrics in addition to welding them. Adjusting an ultrasonic fabric welding machine according to such conditions is well within the capabilities of the ordinary skilled person. It is understood that an ultrasonic welding or cutting and welding machine can be used to carry out methods of the invention in different modes. For example, an open area weld mode provides a thermal reaction between the ultrasound tool and the ultrasound sonotrode and the fleece. A flat compression weld mode provides a thermal reaction between the ultrasound tool, the ultrasound cut/weld tool, and the fleece. This creates a flat fiber surface area, which allows a seam tape to adhere to the edges left behind by an open area weld operation.

A seam according to the invention can be either straight or curved, and the fabric pieces joined can have any shape or form as required for a particular garment piece. Two or more pieces of fabric can be joined to form a seam.

In addition to ultrasound, other sources of energy that can be used to perform a seam welding operation for use in the invention include heat energy, laser energy, and other forms of electromagnetic radiation (e.g., microwave or radio frequency).

Another seam forming operation which can be employed to prepare seams according to the present invention involves the use of a centerline adhesive film to hold the adjacent pieces together until a seam tape is applied and heat-sealed to form the seam. The "centerline adhesive film" is a flexible, organic solvent resistant adhesive film in the form of a tape that can be applied to join the fabric pieces along the length of the seam. The centerline adhesive film contains either a single-faced or double-faced tack adhesive film. When applied across the edges of two pieces of fabric using a heat process (e.g., a hot iron or hot air gun), the centerline adhesive film holds them into position to create a temporary seam (e.g., a portion of an outer garment pattern). A seam tape can then be applied to the joined fabric pieces, and the adhesives in the seam tape activated to provide a hydrostatic seal on the membrane surface of the outer shell laminate. In this manner, a strong seam is formed adhesively and without the use of ultrasound or sewing.

The hydrostatic resistance of an invisible barrier seam is not dependent upon driving the adhesives of a seam tape through the fabric surfaces to re-connect the hydrostatic membrane surfaces, as is required with prior art methods. Instead, the hydrostatic resistance of an invisible barrier seam is accomplished by directly attaching the seam tape to the membrane surface. While not intending to limit the invention to any particular mechanism, it appears that the hydrostatic resistance of an invisible barrier seam is accomplished by forming a continuous hydrophobic barrier through a thermal reaction of the adhesive film structures to connect the membranes of the laminates and the membrane provided in the seam tape.

Several known methods are available for testing the hydrostatic resistance properties of a seam of the current invention. These include ASTM D 5385 Standard Test Method for Hydrostatic Pressure Resistance of Waterproofing Membranes. Preferably, a seam according to the invention has a hydrostatic resistance of at least 1, 2, 3, 4, or 5 psi for 3 minutes using ASTM D 5385. More preferably, a seam according to the invention has a hydrostatic resistance of at least 3 psi for 3 minutes using ASTM D 5385.

One embodiment of the invention is an "invisible barrier seam". The invisible barrier seam is a multi-layer barrier film seam structure in which no seam tape is visible on either the front shell fabric surface or the inner liner fabric surface. Instead, a seam tape is positioned between the inner and outer fabrics. Referring to FIG. 1A, invisible barrier seam 100 is formed from outer shell laminate 15, inner lining laminate 75, and invisible seam tape 55. The seam is formed at the junction between shell fabric laminate pieces 2 and 4 and lining fabric laminate pieces 6 and 8. The shell fabric laminate includes shell fabric 10 to which is attached hydrophobic polymer membrane 20. In one embodiment, the shell fabric laminate also includes an inner layer of a membrane protective fabric, such as a tricot or scrim 25 (see FIG. 1B). The lining fabric laminate includes lining fabric 70 and adhesive layer 60. The seam tape includes hydrophobic barrier membrane layer 40, outer adhesive layer 30, and inner adhesive layer 50.

It is understood that an invisible barrier seam, as well as garments containing such seams, can contain additional components, layers, pieces, additives, adhesives, or fabrics beyond those depicted in FIG. 1. For example, one or more additional insulating layers can be added, or one or more additional seam tapes, particularly to cover an exterior surface of the seam. Adhesive layers can be applied either as a continuous film or as a web of adhesive, or as a powder sprinkled over the underlying surface. In a preferred embodiment, an insulating material is applied to the back surface (i.e., the face hidden within the garment) of the lining fabric (i.e., a fleece or other non-containable fabric) by laminating the insulating material to the lining fabric via a web adhesive.

An "invisible seam tape", "barrier seam tape", "seam tape", or "centerline adhesive seam tape" according to the invention is a multi-layered seam tape that possesses a hydrophobic polymer membrane and two adhesive layers. The term "multi-layered" means that the seam tape can be either 2-ply, 3-ply, or 4-ply. A 2-ply seam tape contains a membrane layer and a single low-melt adhesive layer on either side of the membrane. A 3-ply seam tape contains a membrane layer and two low-melt adhesive layers, one on either side of the membrane. A 4-ply seam tape contains a membrane layer, a fabric layer on one side of the membrane, and two low-melt adhesive layers, one on the exposed side of the membrane and the other on the exposed side of the fabric. In any case, either or both adhesive layers can optionally be covered by a release paper layer. A 2-ply seam tape can be employed, for example, in embodiments where the liner laminate contains an adhesive layer, and the adhesive from the liner seals the side of the seam tape that lacks its own adhesive. Any of the above described seam tape embodiments can further include an optional layer of an adhesive non-woven scrim or web adhesive (see below) attached to either or both of the adhesive layers. A web adhesive is a heat-activated adhesive that ensures optimum flow and penetration of the adhesive layer into fabrics, especially non-containable fabrics such as fleece. Thus, in a preferred embodiment, the seam tape includes a web adhesive layer on the side that will face a fleece liner fabric.

Figure 2A:
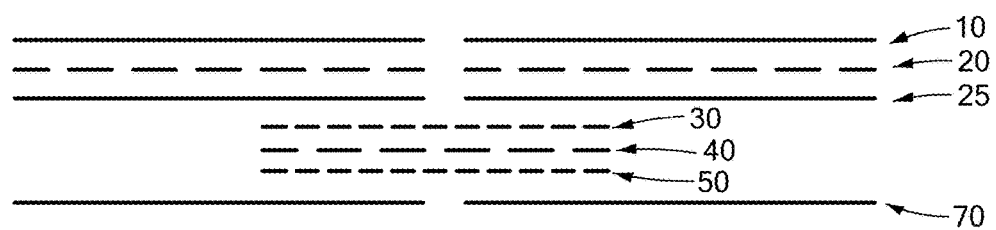
FIGS. 2A and 2B show schematic views of invisible barrier seams for embodiments having partial lamination between shell and lining.
Figure 2B:
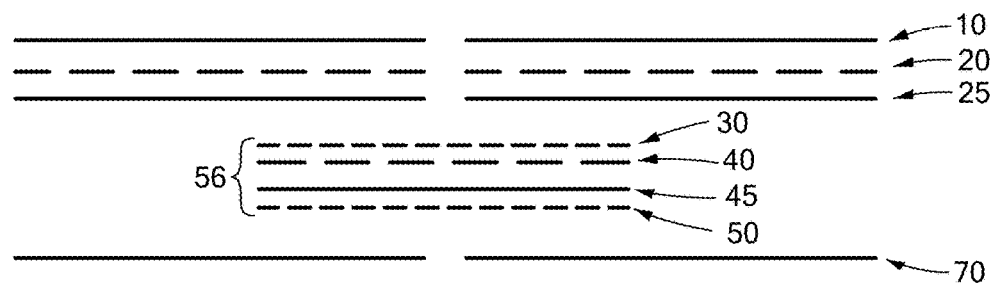

The seam tape is designed to form a waterproof barrier within a seam according to the invention by the fusion of the seam tape membrane with the membrane of the outer shell laminate mediated by a polymeric adhesive that flows through the interior of the seam to physically and functionally join the two membranes. The seam tape includes an optional inner low melt adhesive film layer, a high melt barrier film layer, an exterior low melt adhesive layer, and an option release paper covering the exposed surface of one or both adhesive layers. An embodiment of such a seam tape is shown in FIG. 1A as structure 55. The barrier film layer has a higher melting point that that of either of the adhesive polymer layers, so that the barrier film layer does not melt during seam formation. For example, the melting temperature of the barrier film layer can be, for example, 5, 10, 15, 20, 30, 40, or 50° C. or more higher than the melting temperature of either or both of the inner and outer adhesive polymer layers. Optionally, the two low melt adhesive layers can have differential low temperature melting points, or can have different compositions (e.g., one could be cross-linked and the other not cross-linked), allowing adhesion to be performed first on one side of the seam tape at a lower temperature, then on the other at a higher temperature. Another embodiment of the seam tape is shown in FIG. 2B (structure 56). In this embodiment, the seam tape includes an additional layer of a reinforcing fabric, such as a tricot, which is shown as layer 45 in FIG. 2B.

Figure 3A:
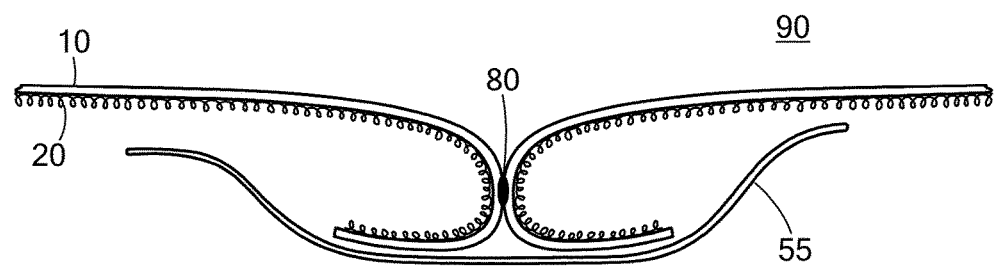
FIGS. 3A and 3B depict cross-sectional views of embodiments of intermediate structures in the formation of an invisible barrier seam. An outer shell seam intermediate structure is shown in FIG. 3A, and an inner liner intermediate structure is shown in FIG. 3B.

FIG. 3 depicts two intermediate structures that are encountered in certain embodiments of a method of making an invisible barrier seam according to the invention. An intermediate structure 90 formed from an outer shell fabric laminate is shown in FIG. 3A. The laminate consists of an outer shell fabric 10 laminated to a hydrophobic polymer membrane 20. Two pieces of the laminate are shown to the left and right of the partial seam structure, which is shown in cross section. The edges of both pieces have been folded over along the seam track such that the outer shell fabric is exposed along the inside face of the seam. The intermediate can be fastened together by sewing or more preferably by using an ultrasonic welding machine, which produces a centerline bead 80 where the outer shell fabrics have been partially melted together. This provides sufficient adhesion to hold the fabric pieces together until seam tape 55 is adhered to cover the folded over pieces of the shell fabric laminate. Barrier seam tape 55 is adhered along the seam track by applying heat and/or pressure. The seam tape forms a continuous hydrostatic barrier across the seam by the fusion of the hydrophobic polymer membrane of the seam tape with the hydrophobic polymer membrane exposed beyond the edges of the folded-over shell laminate, thus forming a continuous hydrophobic polymer membrane across the seam.

Figure 3B:
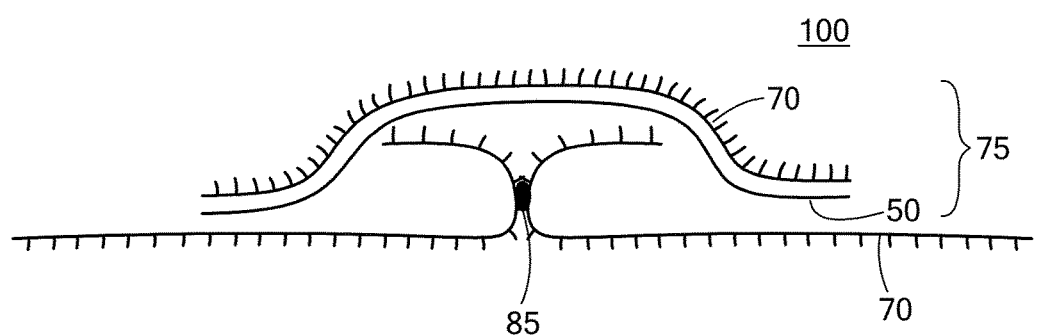

Similarly, the liner intermediate structure 100 shown in FIG. 3B is formed by folding over the edges of the liner fabric 70. The liner fabric pieces can be joined by sewing or using an ultrasonic welding machine, which results in a centerline bead 85 that provides an additional penetration barrier as well as providing adherence until a liner seam tape is applied. In some embodiments, such as that depicted in FIG. 3B, a liner seam tape 75 is then applied to cover the folded-over edges of the liner fabric. A liner seam tape can be used to provide additional hydrostatic resistance to the seam, or to provide additional protection against chemical or biological agents. The liner seam tape can be similar or identical to the barrier seam tape applied to the outer shell seam, e.g., to provide added hydrostatic resistance, or it can have additionally a layer of liner fabric or other fabric having adsorbents for chemical or biological agents. Preferably, the liner seam tape includes adhesive layer 50 and liner fabric layer 70, as depicted in FIG. 3B.

Figure 3C:
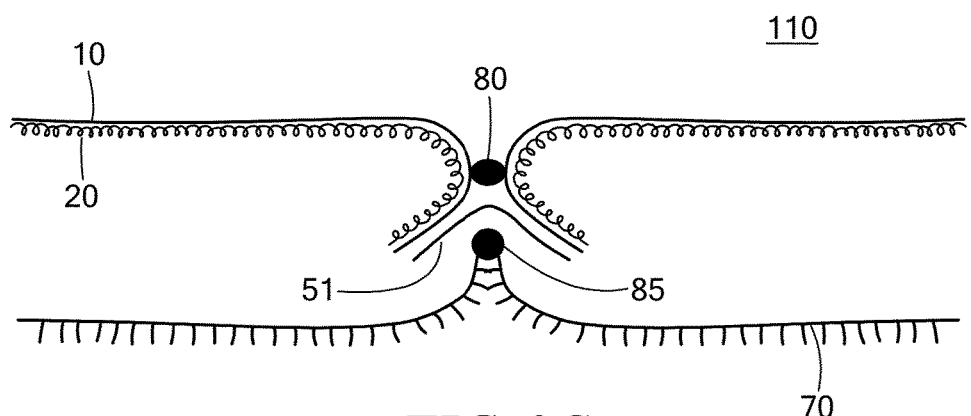
FIG. 3C shows a cross sectional view of an embodiment of an invisible barrier seam having a single-ply seam tape.

FIG. 3C depicts the structure of an embodiment of an invisible barrier seam 110 formed from two intermediate seam structures using a single-ply seam tape. Pieces of an outer shell laminate are joined along a seam track using ultrasonic welding to form a centerline bead 80 a short distance from the edge of the fabrics. The shell laminate includes an outer shell fabric layer 10 and a hydrophobic barrier membrane layer 20. The pieces are joined with the outer shell fabrics facing each other. The centerline bead holds the fabrics together. Flaps of the fabric from each piece protruding from the centerline bead are folded back on the inside of the seam along the seam track, and a single-ply seam tape 51 comprising an adhesive polymer is adhered across the inside of the seam, at least partially covering the flaps; the width of the seam tape can be less than the combined width of the flaps. Corresponding pieces of liner fabric 70 are joined along a seam track using an ultrasonic cut-and-weld process that forms a centerline bead 85 and removes remaining loose fabric material, exposing the centerline bead. The welded liner pieces are then positioned such that the centerline bead of the joined liner pieces is aligned along the centerline bead of the joined shell laminate pieces. The seam is then fused together by applying heat and/or pressure so as to set the adhesive polymer in the seam tape. This type of seam is hydrostatically resistant and is exceptionally thin and flexible, having a clean and barely visible exterior appearance from both sides of the garment.

Another embodiment is a method of making a more robust invisible barrier seam. The method includes the following steps. First, a fabric package is laminated using a conventional commercial lamination process to produce a shell fabric laminate. Alternatively, a commercially available shell fabric laminate may be provided. The shell fabric laminate includes an outer shell fabric, a hydrophobic polymer membrane, and optionally a lightweight tricot or scrim. Next, a liner fabric laminate (e.g., a fleece or other insulating, non-containable fabric) is prepared by laminating an adhesive component to a liner fabric such as a fleece or other non-containable, preferably insulating fabric. The adhesive component is selected so as to be capable of adhering to the shell fabric laminate. The adhesive component can be, for example, an adhesive non-woven scrim, a dry adhesive film, a liquid adhesive, or a dry powdered scatter-coated adhesive layer. In some embodiments, the liner fabric laminate omits the adhesive layer (see FIG. 2A), because in such embodiments the lining fabric will be laminated to the shell laminate only at the seam, or at the seam and a portion of the lining fabric, but not over the entire surface of the lining fabric. A multi-layer barrier seam film or seam tape is prepared by lamination and cutting it to a desired width for integration into the seam to form a waterproof barrier within the seam. Alternatively, the seam tape can be provided from a commercial source. The seam tape includes an optional inner low melt adhesive film layer, a high melt barrier film layer, an exterior low melt adhesive layer, and optional release paper covering one or both adhesive layers.

Figure 1B:
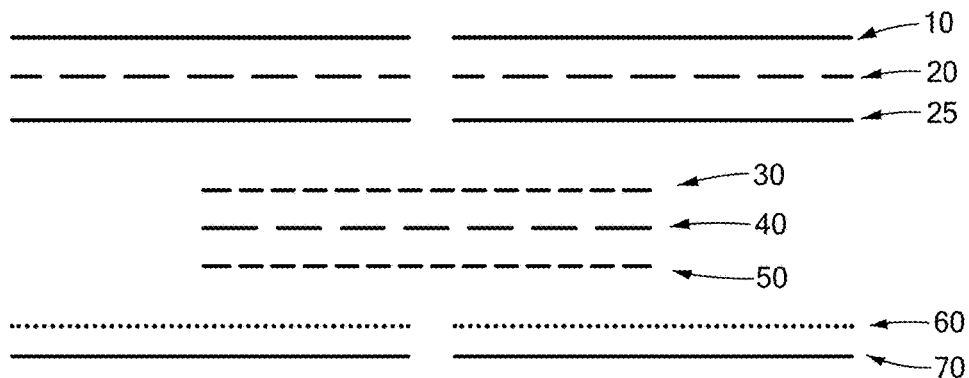

The liner fabric laminate can be laminated to the shell fabric laminate to form a single, shell-liner composite laminate (see embodiments shown in FIGS. 1A, 1B). This process is carried out in such a manner as to allow the later separation of the adhesive layer and the liner fabric from the membrane or optional tricot/scrim package without damaging the membrane surface; this allows the seam tape to be inserted later within the seam. In order to assure that the laminates can be later separated to introduce the seam tape, a limited amount of heat, pressure, and/or ultrasound energy is applied during this lamination step, so that the bond between the shell laminate and liner laminate remains reversible. Later, after garment is complete, more energy can be applied so as to render the composite laminate irreversibly bonded together. In an alternative embodiment, the liner fabric is not laminated to the shell fabric laminate (see embodiments shown in FIGS. 2A, 2B). In such embodiments, the adhesive layer can be omitted from the lining fabric, and preferably a tricot/scrim layer (see structure 25 in FIGS. 2A and 2B) is included in the shell fabric laminate to protect the barrier membrane layer (structure 20 in FIGS. 2A and 2B).

A pattern for two or more garment fabric pieces is then applied to the shell-liner laminate, and the pieces are cut out. The pieces are then placed together and aligned with the shell fabric sides facing together, so as to form a seam track along one edge of the aligned pieces. Once aligned, the seam is initially formed, preferably using an ultrasonic cut and weld operation. Alternatively, the seam is initially formed by sewing the shell fabric laminates together, but not sewing the lining fabric laminates together. The joined fabric pieces are then unfolded so that the interior liner fabric of both pieces is facing upwards. Next, in order to add the invisible barrier seam tape, the two edges of the liner fabric are peeled back from each side of the centerline of the seam. The multi-layer barrier seam tape is then inserted into the seam between the adhesive component of the liner laminate and the hydrophobic barrier membrane or tricot/scrim of the face laminate. Then, hot air or ultrasound is used to weld the barrier seam tape into position and to create a hydrostatic seal along the seam, while the edges of the liner fabric are still peeled back. After the seam tape is welded into position, the paper backing of the seam tape can be peeled back to expose the remaining adhesive film layer on the seam tape. After folding back the two edges of the liner fabric towards the seam centerline, and to cover the seam tape, the liner fabric can be heat welded together to complete the seam.

The process described above is repeated for all the seams of the garment, or at least for all the seams for which moisture resistance is desired.

In yet another embodiment, an invisible barrier seam is produced by first making two entire garments, an inner garment and an outer garment, and then heat welding or sewing them together to form invisible barrier seams throughout the single resulting composite garment. First, the same three starting components are made or provided as in the method described above: an outer shell fabric laminate, an inner liner fabric laminate, and a barrier seam tape. The outer shell fabric laminate contains a shell fabric laminated to a hydrophobic polymer membrane. If the shell laminate and liner laminates are to be co-laminated throughout the garment, then preferably no additional layer is added on top of the membrane, as the membrane will be bonded directly to the lining fabric laminate in the final garment. In that case, an adhesive layer is provided either as the inner face of the liner laminate or as the inner face of the outer shell laminate (e.g., applied over the hydrophobic polymer membrane on the side facing the liner). A preferred adhesive layer is formed by applying a web adhesive material to either the liner laminate or outer shell laminate. An example of a suitable web adhesive is Bostik PE103 web adhesive (e.g., at 20-50 g/sq·yd.), which is a non-woven polyester-based hot melt adhesive that is activated by hot air or radiant heat at 105° C. or steam pressing. On the other hand, if the shell laminate and liner fabric are only to be joined at the seams, then the inclusion of a tricot/scrim layer in the shell laminate is highly preferred, so as to protect the hydrophobic barrier membrane of the shell laminate. In a variation of this embodiment, the outer shell fabric laminate contains a polymer encapsulation layer on the inside surface (or on both inside and outside surfaces) as an alternative to having a hydrophobic polymer membrane.

Next, outer garment pieces are cut out of the shell fabric laminate according to an outer garment pattern. According to an inner garment pattern, which may or may not have non-overlapping seam locations compared to the outer garment pattern, inner garment pieces are cut out from the lining fabric laminate. A mismatch of the outer and inner patterns enables the inner garment (lining fabric), to serve as a backing fabric to the seam film of the outer garment (shell fabric), which not only provides resistance to moisture infiltration but also increases the overall strength of the seam structure of the outer garment. Similarly, the outer garment (shell fabric) then serves as a backing to the inner garment, enhancing seam strength of the inner garment. Alternatively, if the inner and outer garments are to be fused only at the seams of the garment, then the seam locations of the inner and outer garments will preferably overlap.

After the pieces have been cut, each of the outer and inner garments is separately assembled. A preferred assembly method is to ultrasonically cut & weld the seams. An alternative method of assembly is to sew the pieces of the outer garment together and to separately sew the pieces of the inner garment together. Any conventional sewing method can be used. In this embodiment, there is no need to later open the seams to insert the seam tape. Instead, the multi-layer barrier seam tape is welded by heat or ultrasound onto the hydrophobic polymer membrane surface of the shell fabric. This creates a continuous hydrostatic barrier across the seams of the outer garment. Another alternative method of assembly is to use an adhesive centerline seam tape to hold the adjacent pieces of each of the inner and outer garments together, and then to heat-seal the seam tape to the inner face of the respective inner or outer garment. When applied across the edges of two pieces of fabric, the centerline adhesive seam tape holds them into position to create a temporary seam. The adhesives in the seam tape are heat activated to provide a hydrostatic seal on the membrane surface of the outer shell laminate. This technique can be especially useful in assembling the outer garment, since a seam tape will be applied to the outer garment anyway to seal the seams. An advantage of using a centerline adhesive seam tape to assemble fabric pieces is that it can avoid the use of expensive equipment such as an ultrasonic cutting and welding machine.

After the inner and outer garments have been assembled from their respective pattern pieces, the inner garment is positioned inside of the outer garment and the two garments are aligned. As a final step, the complete garment assembly, or any portion thereof, can be subjected to an alignment lamination step by applying a heat and/or pressure source over a large area of the assembled garment, or over the entire garment at once. This final step of alignment lamination creates a strong laminate bond between the two surface fabrics of the garment. An example of an appropriate heat and pressure source is the Dressman ironing robot (Siemens). To use such a robot, the garment is placed over the robot, which is then inflated to fit the garment from the inside, applying pressure. The robot is then filled with heated air or steam, which applies heat to the entire garment. Alternatively, a conventional steam ironing table could be used to carry out alignment lamination. When completed, the garment is entirely waterproof, and because the seam tape is hidden within the seam, the garment is also completely reversible. If a partial adhesive surface area is used on the inner garment (i.e., on the lining fabric), then that surface area including the adhesive would be subjected to an alignment lamination by applying heat and/or pressure to create the inner laminate. If an adhesive is not used on the liner fabric, and the liner fabric is anchored to the inner layer of the low melt adhesive contained on the seam tape surface, then that surface area must be subjected to an alignment lamination or a similar process involving application of heat and/or pressure to essentially just the area containing the seam tape, without the need to perform alignment lamination over the entire garment. In the event that a polymer encapsulated shell fabric is used, care is taken to apply sufficient heat and/or pressure for sufficient time to cure the bond (i.e., to melt the encapsulation polymer) between the shell fabric and the lining fabric laminate.

When an outer garment and an inner garment are assembled by adhesion of the seams of each garment to one another, a "multi-ply seam" is formed, consisting of an outer shell seam intermediate adhered to an inner liner seam intermediate. FIG. 3A shows an embodiment of an outer shell seam intermediate structure, and FIG. 3B shows an embodiment of an inner liner seam intermediate structure. The invention provides a method of assembling a garment having multi-ply seams. First, an outer garment and an inner garment are assembled; one or more of the seams of the inner garment match the position of the outer garment seams. Next, one or more seams in the outer garment are aligned with corresponding seams in the inner garment. A "soft-set adhesion" of the outer and inner garments along the aligned seams is then carried out. In soft-set adhesion, the aligned seams are adhered together but remain adjustable. Soft-set adhesion can be carried out, for example by applying a limited amount of heat and pressure (e.g., manually using a steam iron or a hot air gun for several seconds, e.g. about 2-5 seconds, or about 5-10 seconds, or just enough time, pressure, and/or heat to adhere the seams such that they still can be dissociated. The alignment of the outer and inner garments is then carried out with respect to each other by loosening individual soft-set seams as required, moving the outer and inner garments with respect to each other as appropriate to improve their alignment, and reattaching the soft-set seams to each other. Finally, once the outer and inner garment alignment is satisfactory, a "hard-set adhesion" of the outer and inner garments is performed along the aligned and adjusted seams to form a garment having one or more multi-ply seams. The hard-set adhesion process applies heat and/or pressure in greater amount or duration compared with the soft-set adhesion (e.g., greater than 5 seconds, greater than 10 seconds, or about 20-30 or more seconds with a steam iron or a hot air gun, or sufficient time, pressure, and/or heat to ensure an essentially permanent adhesion of the multi-ply seam). A multi-ply seam can be formed of any type of fabrics, and using any type of intermediate seam structures. Preferably, the outer garment contains an outer shell laminate having a shell fabric and a hydrophobic polymer membrane and the inner garment contains a fleece or other non-containable, insulating fabric. A seam tape can be applied along the seam tracks between the outer and inner garments in order to reduce the permeability of the seam to any desired penetrant, such as water, chemical agents, or biological agents. A seam tape also can be applied between the inner and outer garments to render the seam more robust and durable. If desired, the inner garment and/or the outer garment can include a layer of a heat-activated adhesive material facing the center of the seam, such that the entire inner and outer garments can be adhered to each other.

In any of the previously described methods, except embodiments in which a seam is sewn, an optional additional step is the inclusion of a string adhesive on the outside face of the seam, between the adjacent edges of the outer shell fabrics joined at the seam. A string adhesive contains a fiber, string, or thread, e.g., a cotton or synthetic polymer thread that is coated with a polymer adhesive such as polyester, polypropylene, polyvinylidene fluoride, polyurethane, polyvinyl chloride, or polyethylene. See, for example, products of EY Technologies (Fall River, Mass.). Preferably, the diameter of the string is about the same as the thickness of the outer face fabric. The string adhesive can be added just before or after initially forming the seam, or as a final finishing step. The string adhesive can also be supplied pre-adhered at the centerline of a seam tape; in use, the string would be aligned with the centerline of the seam, so that a butt seam is formed between the pieces of outer face fabric, with the string remaining between the fabric edges. The string adhesive is placed into the region where the two outer shell fabrics come together at the seam prior to a step of applying heat or ultrasound to seal the seam. When the seam is welded by heat or ultrasound energy, the adhesive of the string adhesive melts and coats the cut edges of the shell fabrics, effectively sealing the edges and bonding the edges together. The result is a more robust and durable seam.

The methods, seams, and seam tape described herein can be utilized in the production of outerwear garments, such as waterproof jackets, coats, and suits of any design. A garment product produced using any of the methods, seams, or seam tapes according to the invention can be used, for example, either as a liner for an outer shell assembly or as a stand-alone product. Other garments that can be produced using the methods and seams of the present invention include pants, gloves, hats, socks, and protective suits. The methods and seams of the invention can also be used in any textile product or any product containing a seam between two fabric pieces, including footwear (e.g., shoes, boots), tents, and other products. Seam structure and seam tape can be provided in different widths, such as in widths of 6 mm, 8 mm, or 10 mm or wider. Alternatively, the seam structure is a butt seam and has no nominal width. The methods described herein can be carried out manually or using automation, or any combination thereof.

The present invention makes possible a new type of soft shell fleece or hard shell insulated waterproof jacket. Using previous technologies, soft shell jackets could be made of a waterproof fabric, such as a laminate containing a hydrostatic barrier membrane, but they would leak through any welded or sewn seams. Previous waterproof seam designs placed a seam tape on the interior of the jacket, where the fleece or insulating material had to be shaved down in order to reach the hydrostatic barrier membrane, resulting in an awkward and slow manufacturing process. This would also result in loss of insulation value at the seam. With the present seam design, however, no seam tape is required on the inner fleece side of the seam, and there is little or no loss of insulation at the seam. Further, no seam tape is required on the exterior of the jacket, and the jacket can be made completely reversible without any visible seam tape or impression of a seam tape from either side. Seams according to the present invention also can be made smaller, more flexible, and more comfortable than earlier designs for waterproof seams. Soft shell jackets according to the present invention also have superior properties compared to previously known hard shell jackets featuring waterproof seams. The present seam design permits the insulating material to be placed on the inside of the jacket, and yet still permits the hydrostatic barrier membranes of the laminated fabric to be joined within the seam and to connect through the seam.

As used herein, "consisting essentially of" does not exclude materials or steps that do not materially affect the basic and novel characteristics of the claim. Any recitation herein of the term "comprising", particularly in a description of components of a composition or in a description of elements of a device, can be exchanged with "consisting essentially of" or "consisting of".

Other embodiments of the invention will be apparent to those skilled in the art from a consideration of this specification or practice of the invention disclosed herein. It is intended that the specification and the examples be considered as exemplary only, with the true scope and spirit of the invention being indicated by the following claims.

The following priority applications are hereby incorporated by reference: PCT Application No. PCT/US2011/022230; U.S. Utility application Ser. No. 13/574,714; U.S. Provisional Application No. 61/297,477; and U.S. Provisional Application No. 61/301,366.

What is claimed is:

1. A textile product containing an invisible barrier fabric seam, comprising:
    an outer garment, an inner garment, and a hydrophobic polymer membrane between the outer garment and the inner garment;
    the hydrophobic polymer membrane including at least two pieces joined to form at least one seam disposed between the outer garment and the inner garment; and
    a hydrophobic barrier across the at least one seam of the hydrophobic polymer membrane, the hydrophobic barrier comprising a continuous connection between surfaces of the hydrophobic polymer membrane across the at least one seam;
    wherein the outer garment, the inner garment, and the hydrophobic polymer membrane are fused together over their surfaces areas to provide a laminated garment.

2. The textile product of claim 1, wherein the hydrophobic barrier further comprises a seam tape comprising a single ply of an adhesive polymer, wherein the seam tape is disposed in alignment with the at least one seam of the hydrophobic polymer membrane, to provide a continuous hydrophobic barrier across the at least one seam.

3. The textile product of claim 1, wherein the hydrophobic barrier further comprises a seam tape comprising a further hydrophobic polymer membrane layer and an adhesive layer on one side of the hydrophobic polymer membrane layer, wherein the seam tape is disposed in alignment with the at least one seam of the hydrophobic polymer membrane, and the adhesive of the seam tape is bonded to both the hydrophobic polymer membrane and the further hydrophobic polymer membrane layer of the seam tape to provide a continuous hydrophobic barrier across the at least one seam.

4. The textile product of claim 3, wherein the seam tape includes a further adhesive layer on an opposite side of the hydrophobic polymer membrane layer, so that the hydrophobic polymer membrane layer is disposed between the adhesive layer and the further adhesive layer.

5. The textile product of claim 1, wherein the hydrophobic polymer membrane comprises microporous or nanoporous polytetrafluoroethylene, expanded polytetrafluoroethylene, polyurethane, cross-linked polyurethane, polypropylene, or polyester.

6. The textile product of claim 1, wherein the hydrophobic polymer membrane further comprises a reinforcing layer, a membrane protective fabric, a tricot, or a scrim.

7. The textile product of claim 1, wherein the outer garment comprises at least two garment pieces joined at the at least one seam of the hydrophobic polymer membrane.

8. The textile product of claim 1, wherein the inner garment comprises at least two garment pieces joined at the at least one seam of the hydrophobic polymer membrane.

9. The textile product of claim 1, wherein one or both of the outer garment and the inner garment comprises a fabric laminate.

10. The textile product of claim 1, wherein one or both of the outer garment and the inner garment comprise a fabric coated with silicone, polyurethane, polyester, or polypropylene.

11. The textile product of claim 1, wherein the inner garment comprises a tricot, scrim, fleece, or thermal insulating material.

12. The textile product of claim 1, further comprising an insulation zone between the outer garment and the inner garment.

13. The textile product of claim 1, wherein each of the outer garment and the inner garment are formed of at least two garment pieces joined at a seam, at least one of the seam joining the inner garment pieces and the seam joining the outer garment pieces aligned with the seam of the hydrophobic polymer membrane.

14. The textile product of claim 1, wherein each of the outer garment and the inner garment are formed of at least two garment pieces joined at a seam, at least one of the seam joining the inner garment pieces and the seam joining the outer garment pieces offset from the seam of the hydrophobic polymer membrane.

15. The textile product of claim 1, wherein the product is selected from the group consisting of jackets, coats, parkas, raincoats, cloaks, ponchos, shirts, blouses, pants, vests, capes, gloves, hats, hoods, headwear, shoes, boots, socks, and undergarments.

16. The textile product of claim 1, wherein the product is a reversible garment.

\* \* \* \* \*